(12) United States Patent  
Cooper

(10) Patent No.: US 7,992,409 B1  
(45) Date of Patent: Aug. 9, 2011

(54) CRYOGENIC PROCESS FOR SEPARATION OF CARBON DIOXIDE FROM THE ATMOSPHERE USING A SUPERCONDUCTING WIND TURBINE

(76) Inventor: Willard Cooper, Cherry Hill, NJ (US)

( * ) Notice: Subject to any disclaimer, the term of this patent is extended or adjusted under 35 U.S.C. 154(b) by 0 days.

(21) Appl. No.: 12/804,434

(22) Filed: Jul. 21, 2010

(51) Int. Cl.
*F25J 1/00* (2006.01)
*B01D 53/14* (2006.01)

(52) U.S. Cl. ............................ 62/602; 290/44; 95/228

(58) Field of Classification Search .............. 62/602, 62/640, 642; 290/44, 55; 95/228, 220; 96/242, 96/266
See application file for complete search history.

(56) References Cited

U.S. PATENT DOCUMENTS

| | | | |
|---|---|---|---|
| 2,433,604 | A | 12/1947 | Dennis |
| 2,496,380 | A | 2/1950 | Crawford |
| 2,664,719 | A | 1/1954 | Rice et al. |
| 2,738,658 | A | 3/1956 | Bronson |
| 2,763,137 | A | 9/1956 | Collins |
| 3,093,470 | A | 6/1963 | Melikian et al. |
| 3,103,427 | A | 9/1963 | Jennings |
| 3,144,317 | A | 8/1964 | Arnoldi |
| 6,746,516 | B2 * | 6/2004 | Titmas ......................... 95/229 |
| 7,233,079 | B1 | 6/2007 | Cooper |
| 7,397,142 | B1 | 7/2008 | Cooper |
| 2007/0217982 | A1 * | 9/2007 | Wright et al. .................. 423/230 |
| 2010/0251937 | A1 * | 10/2010 | Murray et al. .................. 106/705 |

OTHER PUBLICATIONS

Klaus S. Lackner et al., "Capturing Carbon Dioxide From Air", first posted on the internet Apr. 16, 2003.*
Posting history of Klaus Lackner paper from the internet archive "wayback machine".*
Manya Ranjan, "Feasibility of Air Capture" Master's thesis at the Massachusetts Institute of Technology, Jun. 2010.*

* cited by examiner

*Primary Examiner* — Cheryl J Tyler
*Assistant Examiner* — John Pettitt
(74) *Attorney, Agent, or Firm* — Norman E. Lehrer

(57) ABSTRACT

A continuous cryogenic process for the separation and removal of carbon dioxide from the atmosphere using, in part, the existing cryocooling apparatus that is a component of the inventor's patented high temperature superconducting wind turbine electric generating and energy storage system. The proposed system is contained within a long, large, non-corrosive, open-ended, double-walled tubular-shaped vacuum or conventionally insulated dewar, which is cantilevered in two or more units from the wind turbine's steel tower. The major internal components consist of a large screen grid, a small screen filter, a low-speed electric turbo-style fan and, most importantly, a series of coated frost-free heat exchangers of differentiated design that freeze the carbon dioxide in the moving air into a form of flake-like dry ice which is then captured for potential reuse or underground sequestering.

4 Claims, 4 Drawing Sheets

CRYOGENIC PROCESS FOR SEPARATION OF CARBON DIOXIDE FROM THE ATMOSPHERE USING A SUPERCONDUCTING WIND TURBINE

FIELD OF THE INVENTION

The present invention relates to the separation and removal of carbon dioxide from the atmosphere and, more particularly, toward a cryogenic process for the separation of carbon dioxide from the atmosphere using a superconducting wind turbine.

BACKGROUND OF THE INVENTION

A respected scientific publication estimates that about 500 billion tons of carbon dioxide has accumulated in the atmosphere since the onset of industrialization. Some projections, based on current trends, suggest that we may see an aggregate accumulation of a trillion tons before 2050. Some in the scientific community conjecture that this may be enough to move the planet into a danger zone that would result in serious changes to the world's climate. If continuing research further establishes that elevated temperatures will destabilize the earth's climate, then the nations of the world may be forced to resort to actively begin removing the continuing accumulation of increasing levels of carbon dioxide from the atmosphere as a critical issue of long term safety.

The innovative atmospheric carbon capture technologies that have been proposed to date appear to be extraordinarily expensive. They involve the use of chemical solutions and membranes that trap the carbon dioxide molecules and subsequently release them for deep underground storage. The process of capturing carbon dioxide worldwide requires the new construction of a vast number of tall structures that resemble cooling towers and whose carbon-capture process has a large demand for energy. Their construction and operating expenses could reach an estimated annual cost of a trillion dollars projected to the year 2100.

In 2007, this inventor received approval for a Renewable Energy Electric Power Generating System, U.S. Pat. No. 7,233,079 and in 2008, a modification, U.S. Pat. No. 7,397,142. It consisted of a high-performance high-temperature superconducting wind turbine with low value energy generated at night and stored in a high energy density high-temperature superconducting magnetic energy storage system located in the turbine's tall cylindrical structural steel tower. Both the superconducting wind turbine generator and its superconducting energy storage system require a cryogenic refrigeration system to support superconducting operation. It provides the basis for a new, more cost effective approach for atmospheric carbon capture.

First, a review of the phase diagram for carbon dioxide indicates that carbon dioxide molecules can be easily frozen into 'dry ice flakes' by using the spare capacity of the on-board cryorefrigeration system. Secondly, the structural steel wind turbine tower has the capability to also physically support the cryogenic carbon capture apparatus. Thirdly, the SMES energy storage system has around-the-clock capability to support the additional new apparatus that includes heat exchange systems and an electric air flow distribution fan.

Hence, with limited additional equipment and minor design modifications, the patented superconducting wind turbine and energy storage apparatus can be adapted to effectively capture atmospheric carbon dioxide for subsequent commercial reuse or for potential deep underground sequestering in a more cost effective manner.

The inventor's high-performance superconducting wind turbine would no longer be limited to efficiently generating and storing renewable energy, but additionally becomes an instrument for the cryogenic separation and capture of carbon dioxide from the atmosphere with a variety of reuse potential. This dual role modification creates the possibility for a safer and cleaner carbon-capped renewable energy future for mankind.

SUMMARY OF THE INVENTION

The invention relates to a continuous, non-batch, cryogenic process for the separation and removal of carbon dioxide from the atmosphere using, in part, the existing cryocooling apparatus that is a component of a high-temperature high-performance superconducting wind turbine electric generating and energy storage system.

The existing components consist of the tall steel structural tower, the electric generation system, the energy storage system, the all-important cryorefrigeration system with a molecular vacuum pump, and the sensor system that monitors weather conditions and wind speed direction, and has controls for overall system reactions.

The proposed modification consists of the addition of an atmospheric carbon capture apparatus, consisting of a large, long, vacuum or conventionally insulated, non-corrosive, double-walled tube that resembles an open-ended dewar; it is referred to as the 'nascelle'. A plurality of nascelles are structurally cantilevered from the wind turbine's steel tower and physically integrated with the electrification, cryorefrigeration, and weather and wind monitoring and control equipment. The tubular shape of the containment vessel is critical in assisting the prevention of frost or ice formation on the inner-wall of the nascelle. All internal components are treated with a U.S. patented frost prevention coating. The design of the nascelle has an upwardly sloped design at the frontal and rear ends of the nascelle that inhibit the amount of precipitation that can enter, in conjunction with automatically-controlled and electrically-operated doors or shutters that protect the system in the event of severe weather conditions.

In addition to the doors or shutters system, proceeding from front to rear, the internal components consist of a large screen grid, a smaller mesh-type permanent filter, a low-speed electric turbo-style fan, a pre-cooling system, a series of distinct cryogenic heat exchangers, separate water vapor and carbon dioxide trough-like collection systems, and an insulated, non-corrosive piping system that takes the captured moisture-laden water vapor and the flakes formed from the dry carbon dioxide to ground level for appropriate storage. The moist snow flakes will melt, assuming a liquid state, and the carbon dioxide's dry ice flakes will sublime into a gaseous state and be pressurized at ambient temperature for optimum temporary storage for potential reuse or sequestration.

BRIEF DESCRIPTION OF THE DRAWINGS

For the purpose of illustrating the invention, there are shown in the accompanying drawings forms that are presently preferred; it being understood that the invention is not intended to be limited to the precise arrangements and instrumentalities shown.

DETAILED DESCRIPTION OF THE INVENTION

Figure 1:
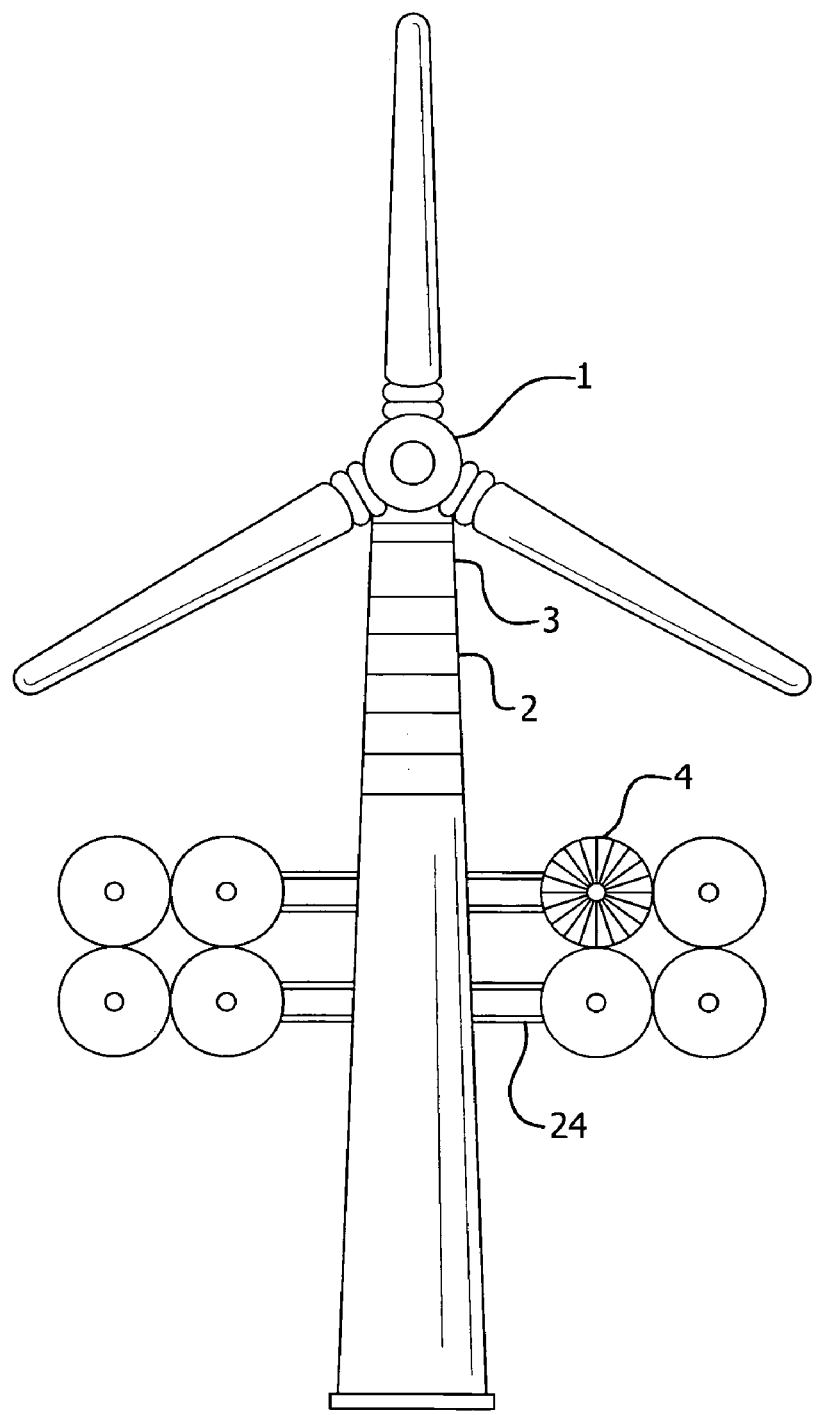
FIG. 1 is a front view of apparatus for carrying out the invention schematically illustrating the general arrangement of the major components of a large-scale integrated superconducting wind turbine with nascelles for the capture and removal of carbon dioxide from the atmosphere.
Figure 2:
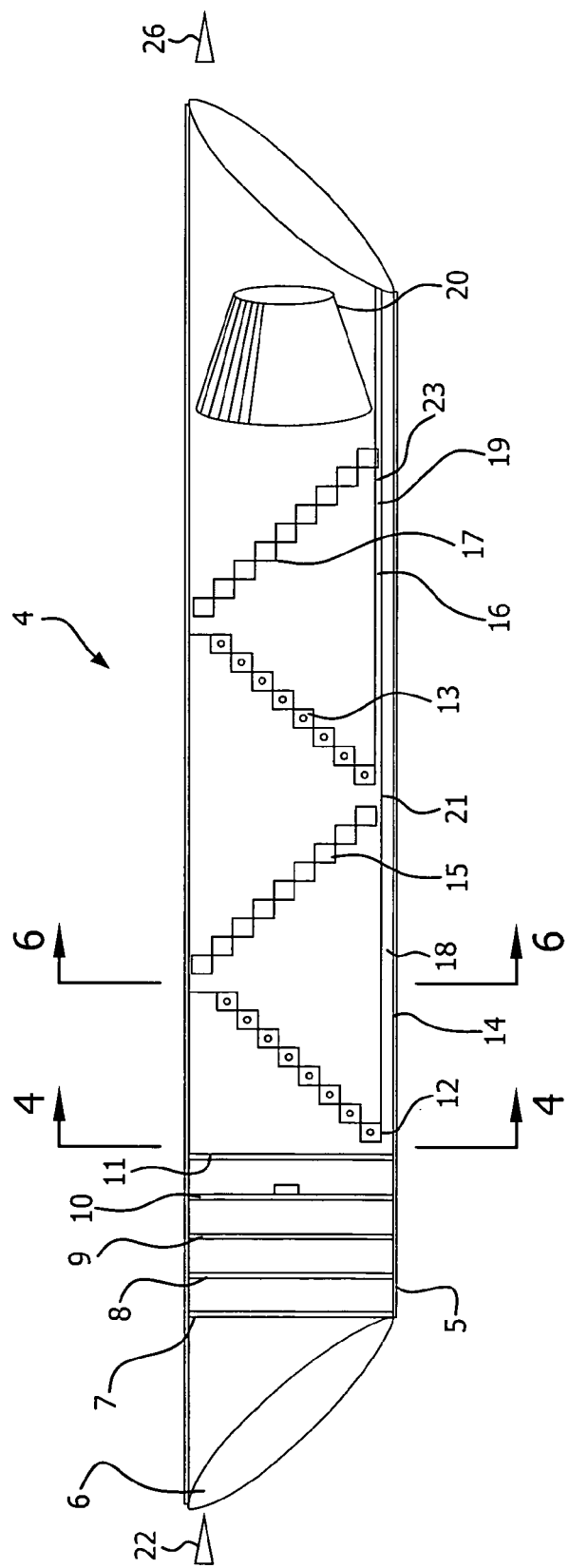
FIG. 2 is a cross sectional view of the structure of FIG. 1 illustrating, in detail, the components of the carbon monoxide capture and removal from the atmosphere of the cryogenic nacelle system.
Figure 3:
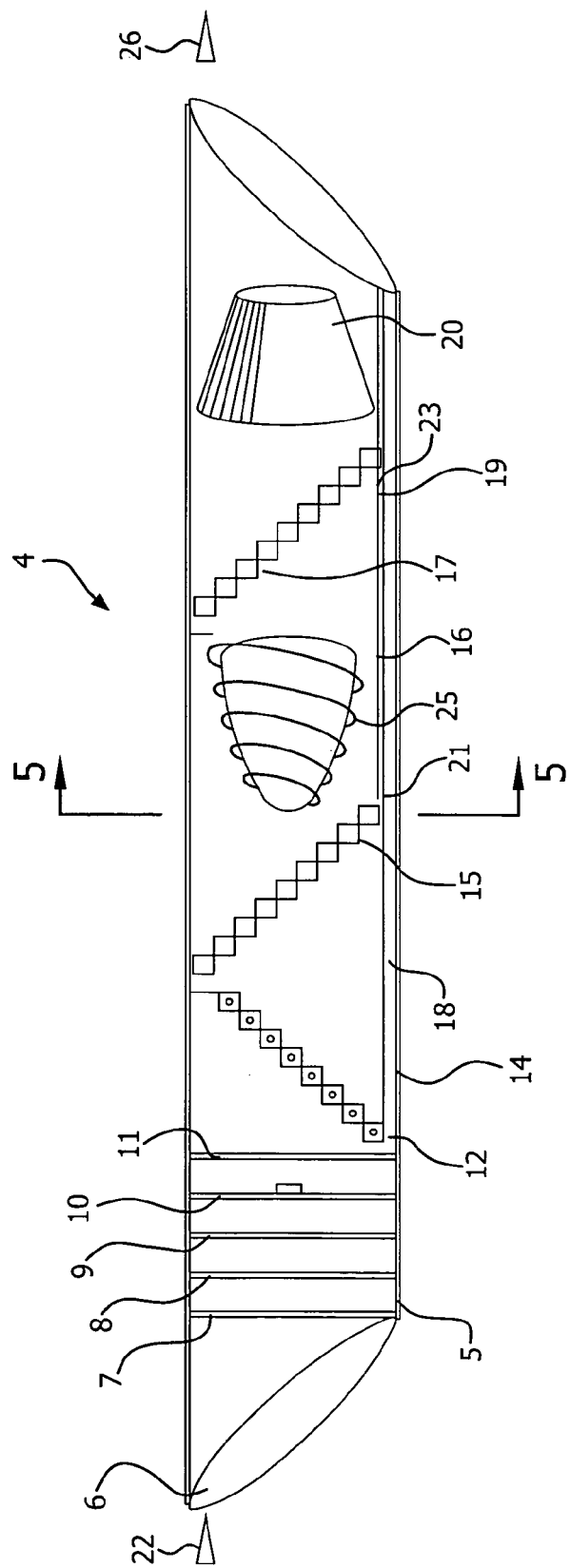
FIG. 3 is a cross sectional view illustrating the carbon dioxide capture and removal system with an alternative embodiment of the stage two heat exchanger.
Figure 6:
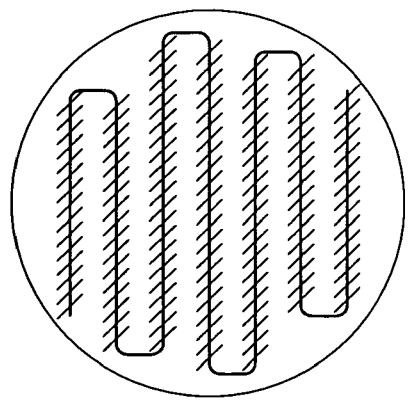
FIG. 6 is a cross sectional view taken through the line 6-6 of FIG. 2.
Figure 5:
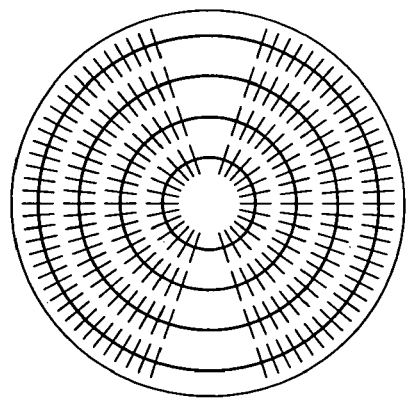
FIG. 5 is a cross sectional view taken through the line 5-5 of FIG. 3.
Figure 4:
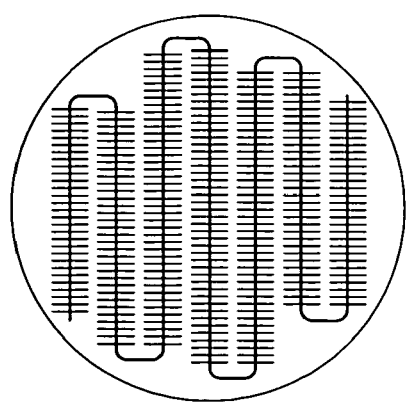
FIG. 4 is a cross sectional view taken through the line 4-4 of FIG. 2.

This invention relates to a continuous, non-batch, cryogenic process for the separation and capture of atmospheric carbon dioxide utilizing, in part, the existing cryocooling apparatus that are components of the inventor's high-temperature superconducting wind turbine electric generating and energy storage system (see U.S. Pat. Nos. 7,233,079 and 7,397,142). Apparatus for this new function of cryogenically separating and capturing atmospheric carbon dioxide is integrated via additions and modification to the existing superconducting wind generating and energy storage devices. Since the carbon capture apparatus will be a physically integrated component of the patented wind turbine, it is necessary to describe how the original superconducting wind turbine system works.

First, a steel structural tower, several hundred feet tall, supports the turbine's high-performance electric direct-drive generator and blades, located in the elevated turbine nacelle. Arrays of wind turbines are usually sited on high ridges, open plains, off-sea coasts, or the Great Lakes, generating and feeding electricity into a regional electric grid. The wind turbine nacelle has the ability to swivel 360°, so as to always face directly into the wind. Also, the pitch of the blades can be adjusted to optimize the speed of rotation.

Secondly, the wind turbine's high-performance direct-drive generator uses superconducting second-generation coated high-temperature conductors, consisting of yttrium, barium, and copper oxide (YBCO) for the rotor and, where practical, stator coil windings (1). The superconducting magnetic energy storage (SMES) module coils are wound exclusively with YBCO conductors.

Thirdly, excess power from the turbine generator, produced at night, is stored in the cylindrical energy storage modules located within the tall supporting steel structure (2).

Fourthly, also located within the structural tower is the all-important cryorefrigeration system (3) that services the superconducting cryocooled turbine generator and the cryocooled SMES modules.

Fifth, the wind turbine blades, which are designed to move at an average speed of about seventeen miles per hour, must be shielded from any change in the wind performance that may induce a frequency modulation in blade movement as a result of the airflow intake procedure which is the first stage of the new carbon dioxide capture apparatus.

The new carbon dioxide capture apparatus is comprised essentially of a large vacuum or conventionally insulated, horizontal tube-like containment vessel (nacelle) that resembles a large, long, conventional, but open-ended dewar (4). It can be made of non-corrosive material such as stainless steel, aluminum, or fiber-reinforced plastic, and is designed to withstand the elements. The small space between the two walls of the containment vessel can be a vacuum for insulation purposes or filled with any commercially known high-performance insulation materials. If a vacuum insulation system is chosen, then a molecular vacuum pump is part of the on-board equipment of the wind turbine that services the existing cryogenic refrigeration system which supports the wind turbine's superconducting generator and energy storage modules.

The tubular shape of the air-separation containment vessel (5) is critical, so as to prevent any frost or ice formation on the inner-wall of the tube, which is treated with a U.S. patented frost prevention coating or a similarly effective coating. Each end of the containment vessel is sloped upwardly to generally protect against precipitation from entering the vessel. Electrically operated doors or shutters (6), which close automatically in the event of severe weather conditions, are located at the frontal section of the air intake (22) part of the vessel and the rear air exit opening (26). They are tapered at approximately a 45° angle, conforming to the front and rear tubular configuration. The sensors and controls aboard the wind turbine that monitor weather conditions and shut down the wind turbines during severe weather conditions can be assigned the dual role of also servicing the integrated atmospheric carbon capture apparatus by also signaling the closing of the front and rear door or shutter system on the containment vessel.

Standing vertically, just inside the containment vessel, is a screened grid (7) designed to keep out larger objects that may be in the moving air. Immediately behind the grid is a permanent vertical fine filter (8) that intercepts and captures smaller particles. A circumferential high-pressure water spray tubing (9), using water removed from the air and stored externally, is available for a periodic cleansing of both the screened grid and filter. All three components are constructed with non-corrosive material.

Standing several feet behind the air filter system is a full-diameter circumferential low-speed air-intake fan with turbo-style blades (10); it may have either an axial or rim-style motor. Again, the fan blades are non-corrosive and the electric motor is sealed, and waterproof, as protection from foreign elements in the air. The function of the fan is to provide a constant volume of airflow with optimized air speed for subsequent processing in the heat exchangers. Hence, the fan speed is variable and can be controlled and adjusted, and set for optimum performance. It can also be reversed as part of the periodic cleansing procedure for the screen grid and filter. Adequate low-value around-the-clock electricity is always available from the superconducting magnetic energy storage (SMES) system located in the adjoining wind turbine tower, in which low-cost electricity is stored at night when energy demand is minimal.

Immediately behind the air-circulating turbo-style fan is a pre-cooler consisting of several rows of circular tubing loops that are attached to the inner surface of the inner-wall of the containment vessel (11). The pre-cooling tubing serves to return the circulating coolant after passing through the series of heat exchangers back to the cryorefrigeration system located within the structural tower of the wind turbine where the required cold operating temperature is reestablished for the continuous recirculation through the heat exchange system. This pre-cooler circumferential coolant tubing provides a limited initial cool-down of the warmer ambient airflow prior to its subsequent exposure to the much colder heat exchange systems.

The first stage of the cryogenic heat exchanger (12) is designed to specifically initially freeze the water vapor in the moving air at a specific temperature to create snow-like flakes. The second stage of the cryogenic heat exchangers (13) operates at a much colder temperature, and is designed to freeze the carbon dioxide molecules into dry ice flakes. The carbon dioxide molecules in the atmosphere are currently calculated at approximately 390 parts per million, or the equivalent to slightly less than one part per 2600. However, in volume and mass, the percentages are reported to be much closer to roughly 0.038% and 0.59%, respectively.

In order to determine the temperature required to first freeze the water vapor in the air, reference is made to a phase diagram which confirms that water freezes at approximately 32° F., at one atmosphere, or a slightly colder temperature in moving air. Hence, the process will avoid the need for pressurization, which requires compression with its associated energy costs. Carbon dioxide will freeze at approximately −109° F., at one atmosphere; however, the literature indicates that, to account for kinetic energy associated with moving air, a somewhat colder temperature is required to achieve freezing, in order to create dry carbon dioxide ice flakes. In rapidly moving air, the temperature requirement drops to −130° F. or lower. The high-temperature wind turbine cryorefrigeration system operates on a standard liquid nitrogen regime, at approximately −321° F. Though not required, much colder cryorefrigeration temperatures can be achieved by utilizing other liquefied gases such as neon, hydrogen, or helium. Using liquid nitrogen as the circulating coolant in the cryorefrigeration system in a double-walled, insulated, open-ended vessel to process moving air at an optimized, controlled speed, should prove to be more than adequate to freeze the airborne carbon dioxide molecules, which require a basic freezing temperature of approximately −130.3° F. Air speed is a function of the low-speed turbo-style electric fan with variable speed capability, which permits the ability to adjust for optimum air movement velocity under specific conditions.

Hence, there is a reverse process sequence to the pathway for the continuous circulation of the cryogenic coolant since there is a need for three different temperature levels required for each of the two heat exchangers and the pre-cooling unit. The coolant circulates from the cryorefrigeration unit in the wind turbine tower directly to the second stage heat exchanger, first providing the coldest temperature for the freezing of the carbon dioxide dry ice flakes in moving air, which require the coldest temperature (−130° F.). There are anticipated losses in temperature as the coolant then moves on to the first heat exchanger, in which the water vapor in the air is frozen into snow flakes at approximately 32° F. The pre-cooling circumferential up-front tubing receives the warmer coolant after it has circulated through the first stage heat exchanger and is routed back to the cryorefrigeration system located in the wind turbine tower. Hence, the air movement process is in reverse of the coolant pathway. It moves through the pre-cooler first, then the first stage heat exchanger, followed by movement through the second stage heat exchanger.

A cryogenic heat exchanger is specifically designed to freeze, separate, and capture the water vapor in Stage 1. In Stage 2, the colder carbon dioxide heat exchanger provides a replication of the Stage 1 heat exchanger, but provides a lower, colder temperature necessary to freeze the carbon dioxide.

In each case, a snow or ice-like flake effect is achieved: the first, moist, and the second, dry. Both cryogenic heat exchangers consist of a series of metal tubing that run horizontally within a circumferential pattern, supporting a series of closely spaced metallic vertical fins. The stainless steel tubing system carries and circulates the liquid nitrogen at an initial temperature of −321° F. Copper and aluminum tubing possess excellent heat exchange characteristics. Hence, the series of vertical fins, may be fabricated preferably from copper or aluminum due to their high heat-exchange characteristics. They are supported by the horizontal stainless steel pipe system that circulates the cryogenic coolant. Size and spacing of the fins through which the tubing passes, providing physical support for the fins, should be optimized based on a determination of air movement velocity, volumetric throughput requirements, and heat absorption capacity. The fins are all arranged in a vertical configuration, in order to avoid frost formation. The horizontal rows of cryogenic tubing and the first and second stage heat exchanger piping components are staggered at approximately a 45° downward angle, resembling the risers on a descending staircase. In order to ensure that the frozen water flakes descend via gravity into a collection trough (14) beneath the first stage heat exchanger, another device containing a series of non-coolant fins, acting as a backstop (15), descends an oppositely-angled staircase on which the fins are individually angled to interrupt the forward motion of the flakes without disrupting the airflow. This configuration avoids most of the frozen molecules (snow flakes) from coming in contact with other parts of the system as they descend to the bottom of the containment vessel and are collected in a downward-sloping stainless steel trough, tilting towards the rear end of the nacelle.

Sited below the first stage heat exchanger, sitting on the inner belly of the containment vessel, is a stainless steel semi-circular lineal trough designed to collect the frozen water vapor ‘snow flakes’. It drains downward towards the rear of the containment vessel and ultimately feeds into a downspout water collection system (not shown). A second trough (16), capturing the carbon dioxide dry ice flakes, is located below the second stage heat exchanger and backstop, providing a two-level separated trough system.

With the first stage separation and removal of the water vapor from the moving air in the form of snow flakes, the much colder second stage heat exchange system is specifically designed to freeze and separate the moving carbon dioxide molecules by converting them to ‘dry ice flakes’ at the colder temperature.

Another embodiment is designed to provide the second heat exchange system with a significantly reduced volume of circumferential opening for the movement of air as it moves through the second heat exchanger (25). It includes a hollow, horizontally-suspended cone-shaped tank with rounded ends, centrally located within the containment vessel. It runs the length of the second stage heat exchanger, increasing in circumference from front to rear. In contrast, the outer containment vessel walls maintain a constant horizontal dimension. Hence, the air passageway between the two vessels is constructed by design to feature a larger air movement passageway at its frontal end and expanding in circumference with a smaller, more constricted opening as it moves from the frontal end to the rear. This creates a Venturi effect that is designed to maintain a constant speed of the moving air by compensating for any loss of air movement velocity, resulting from the air’s passage through the heat exchanger’s integrated pipe and fin system.

The suspended spiraling refrigeration tubing, which carries the liquid nitrogen coolant, has a spiraling design that increases in diameter and circumference from front to rear, creating a narrowing passageway for the moving air, created by the hollow cone-shaped linear tank, which increases in diameter from front to rear, thus narrowing the opening which helps to maintain a colder temperature. This also increases the air movement speed to compensate for any potential loss of speed as the air passes through the heat exchanger’s pipe and fin system, thus avoiding the use of mechanical assist systems. The spiraling heat exchange mechanism is suspended midway between the diminishing opening between the innerwall of the double-walled vacuum containment vessel and the outer surface of the suspended hollow, cone-shaped horizontal tank, which correspondingly increases in diameter. All components of either heat exchange system are non-corrosive and coated with specific material to prevent any frost formation.

In order to prevent frost formation, the heat exchangers' heat transfer fin system is also configured vertically around the increasing spiral circumference of the coolant piping as it encircles the conical insert tube, thereby maintaining the air's movement speed while further reducing cold temperature losses. Also, in order to ensure that the frozen carbon dioxide flakes descend via gravity into a collection trough beneath the second stage heat exchanger, another series of non-coolant fins, also acting as a backstop (17), descend an oppositely-angled descending staircase on which the fins are also individually angled to interrupt the forward motion of the flakes without significantly disrupting the airflow.

At the bottom of the containment vessel, beneath the first and second stage heat exchangers and backstops are semicircular segregated troughs that are designed to collect the snow flakes created by the frozen water vapor and the dry ice flakes created by the frozen carbon dioxide. Electric motorized moving conveyor belts (18,19), with ridges having a downward sloping moving design, as well as small electric suction fans (21,23) may be included, if needed, in the trough designs to ensure that both the moist snow flakes in the lower trough and the dry ice flakes in the upper trough are effectively moved into the insulated vertical downspout system on an uninterrupted basis. The insulated stainless steel downspout systems (not shown), ultimately attached to the exterior of the wind turbine structural tower, bring the respectively separated snow flakes and dry ice flakes to individual stationary or mobile stainless steel storage tanks at ground level. It should be noted that the trough collection system for the carbon dioxide dry ice flakes sits beneath the second stage heat exchanger and backstop and on top of the snow flake collection trough that begins under the Stage 1 heat exchanger and backstop. This prevents any possible comingling of the respective flakes. It should be farther noted that the non-corroding well-insulated downspout duct system should prevent any sublimation of the carbon dioxide dry ice flakes into a gaseous state prior to entering the pressurized storage system at ground level.

The air, minus the water vapor and carbon dioxide molecules, now consists primarily of nitrogen, oxygen, and a small amount of argon, as well as a minute amount of other residual molecular components, which exits the rear opening of the nacelle. When the system is operational, the continuously moving exhaust air exiting the nacelle, after processing the water vapor and carbon dioxide, provides resistance to any external atmosphere from entering the system from the rear. However, to better ensure such resistance, a more effective device could be installed, consisting of a bucket-shaped series of horizontal, flexible slats (20) that are kept open by the exiting moving air and tighten up proportionately relative to the volume, speed, and pressure of that air. Examples can be found on the variable area exhaust end of some jet engines. The rear exit of the nacelle is tilted upward at a 45° angle, in the same fashion as the front entrance, with electric doors or shutters that close automatically in the event of severe weather conditions, as determined and controlled by the system of sensors aboard the superconducting wind turbine. All internal components of the entire system are coated so as to not only resist, but to prevent frost or ice formation. Refer to U.S. Pat. No. 5,032,641. The lack of any horizontal flat surfaces for all internal components provides a supplementary additional level of protection against frost formation.

In order to reduce energy costs and losses in the cryogenic refrigeration system, another embodiment would change the use of liquid nitrogen (−321° F.) to an optimized cold temperature gaseous nitrogen that could maintain a temperature, colder than −130° F., but significantly less than −321° F., in the second stage heat exchanger necessary to freeze the atmospheric carbon dioxide into dry ice flakes. Hence, additional controls would be required to permit the cryorefrigeration system, located in the adjacent wind turbine tower, to circulate the nitrogen in a gaseous state at an optimum temperature below liquefaction at −321° F. for circulation through the heat exchanger systems. To repeat, the gaseous coolant pathway will circulate in the second stage carbon dioxide heat exchanger first, and then move on to the first stage heat exchanger, where it freezes the water vapor into snow flakes. The coolant then is routed for circulation through the prephase early coolant system prior to its return to the integrated cryorefrigeration unit in the wind turbine tower. To repeat, the countervailing direction of the air movement is opposite to the movement of the coolant, since the lower temperature is required to process the carbon dioxide in the second stage heat exchanger, which receives the coolant first, at its coldest temperature.

A significant 'carbon negative' result could be achieved by the atmospheric capture and processing of carbon dioxide by the system described herein, if the current national sequestration research efforts prove successful. Also, the first stage removal and reuse of water vapor from the air, along with the second stage capture and reuse of carbon dioxide can create an excellent 'carbon neutral' process for hydroponic agricultural production in a controlled greenhouse environment. Also, the use of carbon dioxide in the production of synfuels has been extensively discussed in the literature.

It is essential that the atmospheric carbon-capture nacelles be strategically located with respect to the wind turbine components, particularly the cryogenic refrigeration and energy storage systems, in order to create the most efficient integration. The multi-bladed, variable speed, turbo-like electric fan solves the problem associated with the natural intermittency in wind speed, with its ability to provide an adjustable, reliable, constant level of airflow. While most large wind turbine nacelles generally have the capability to turn 360° in order to, at all times, directly face into a variable wind in order to maximize efficiency, the electric air-intake fan of the carbon capture system provides a much superior constancy of airflow speed, thereby significantly increasing the efficiency of the carbon capture process.

Hence, the cryogenic carbon-capture nacelles have been located immediately below the level of the wind turbine blades and are cantilevered from the structural steel tower, thereby eliminating any threat of potentially creating frequency modulation interference. To support the nacelles, hollow cylindrical or rectangular structural steel support arms are extended outward, perpendicular to the tower (24). They can be designed to support multiple nacelle units, both horizontally and vertically. A similar open-ended insulated hollow cylindrical or rectangular structural support arm on the side of the cryogenic nacelle can be designed to fit either internally or externally into or over the cantilevered structural stainless steel arm which is extended from the wind turbine tower. Both arms have hollow interiors to permit space for the insulated cryogenic tubing and the insulated electric wiring, both of which service the new apparatus.

The present invention may be embodied in other specific forms without departing from the spirit or essential attributes thereof and accordingly reference should be made to the appended claims rather than to the foregoing specification as indicating the scope of the invention.

I claim:

1. An apparatus for the separation of carbon dioxide from the atmosphere using a superconducting wind turbine comprising:
   a vertically extending structural tower, a high temperature super conducting cryocooled electric generator mounted adjacent the top said tower and including a plurality of blades for driving said generator;
   a cryorefrigeration system mounted on said tower providing a cold liquefied gas for said super conducting cryocooled electric generator;
   a horizontally arranged tubularly shaped vessel mounted on said tower, said vessel having a first end and a second end and being substantially open at each end;
   a fan located adjacent said first end for forcing air through said vessel;
   heat exchangers within said vessel arranged to be in contact with the air passing through said vessel;
   said heat exchangers being cooled by said cryorefrigeration system to a temperature low enough to freeze carbon dioxide in said air passing through said vessel.

2. The apparatus for the separation of carbon dioxide from the atmosphere using a superconducting wind turbine as claimed in claim 1 wherein said tubularly shaped vessel is substantially surrounded by a vacuum jacket.

3. The apparatus for the separation of carbon dioxide from the atmosphere using a superconducting wind turbine as claimed in claim 1 wherein said tubularly shaped vessel has an upper wall and a lower wall and wherein the upper wall at each end extends beyond the lower wall to prevent precipitation from entering the vessel.

4. The apparatus for the separation of carbon dioxide from the atmosphere using a superconducting wind turbine as claimed in claim 1 further including a plurality of said tubularly shaped vessels mounted on said tower.

* * * * *